R. O. WELCH.
GRAIN LOADER AND UNLOADER.
APPLICATION FILED AUG. 25, 1911.
1,067,450.
Patented July 15, 1913.
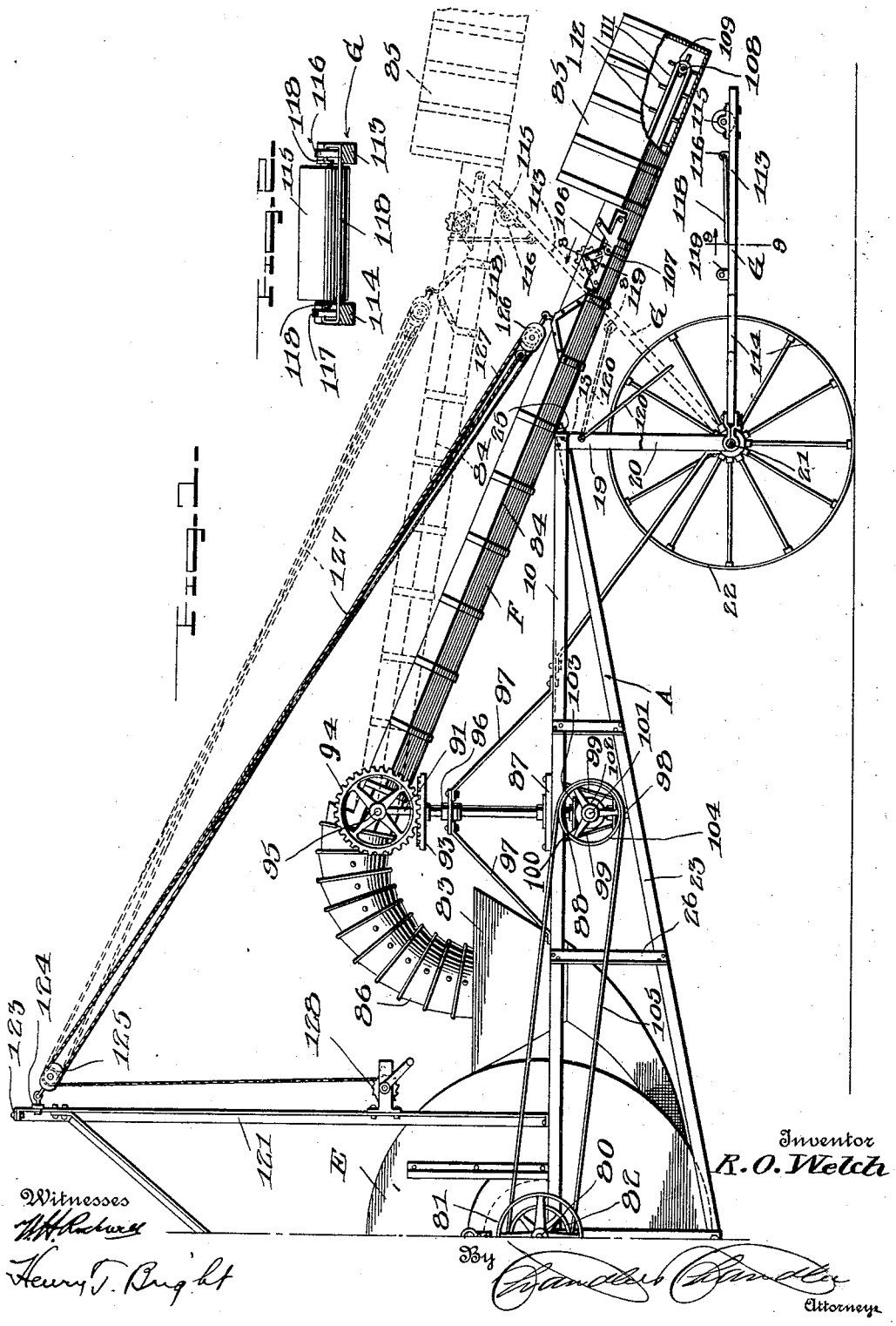
Witnesses
Inventor
R. O. Welch
By
Attorneys

UNITED STATES PATENT OFFICE.

RILEY O. WELCH, OF LYONS, KANSAS.

GRAIN LOADER AND UNLOADER.

1,067,450.

Specification of Letters Patent.   Patented July 15, 1913.

Application filed August 25, 1911.   Serial No. 645,980.

*To all whom it may concern:*

Be it known that I, RILEY O. WELCH, a citizen of the United States, residing at Lyons, in the county of Rice, State of Kansas, have invented certain new and useful Improvements in Grain Loaders and Unloaders; and I do hereby declare the following to be a full, clear, and exact description of the invention, such as will enable others skilled in the art to which it appertains to make and use the same.

This invention relates to grain loaders and unloaders.

The object of the invention resides in the provision of a machine for loading and unloading grain which may be easily transported from place to place and in which the receiving and delivery elements of the machine may be adjusted relatively to the grain supply and to the vehicle to which the grain is being loaded respectively without necessitating any bodily movement of the machine.

With the above and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a side elevation of the rear half of the machine partly in section, and with the receiving element shown in dotted lines in the position it would occupy when transporting the machine from place to place, and in full lines in one position it would occupy during the operation of loading, Fig. 2 an enlarged section on the line 9—9 Fig. 1.

Referring to the drawings, the machine is shown as comprising a truss frame A. Depending from the rear end of the frame depend vertical arms 19 and 20, the free ends of which are connected together by means of an axle 21 carrying the wheels 22. The upper and lower frame members 10 and 23 are connected together by means of angle irons 26.

Mounted in the frame A is a fan casing E. Extending transversely through the casing E and journaled on the side members 10 and 11 is a shaft 80 upon which is mounted interiorly of the casing E the usual fan (not shown). This shaft 80 extends laterally of the machine at one end and has fixed on said extension belt wheels 81 and 82 the former of which is adapted for connection to a suitable source of power.

Grain is fed to the interior of the casing E by means of a hopper 83 which communicates with the interior of the casing at the rear of the latter near its bottom. Grain is supplied to the hopper 83 by means of a conveyer F which includes a trough shaped intermediate portion 84 provided at its outer end with a hopper 85 and at its inner end with an adjustable mouth 86. This mouth is constructed of a plurality of sections as shown, and serves to permit the communication between the conveyer F and the hopper 83 to be maintained when the free end of the conveyer is positioned to one side of the machine.

Mounted upon the upper side members of the frame at the rear of the hopper 83 is a plate 87 in which is journaled a vertical shaft 88. Fixed upon the upper end of the shaft 88 is a gear 93 which meshes with a gear 94 fixed on a shaft 95 journaled in an arm 91, said shaft 95 serving to support the conveyer F so that same may be adjusted vertically at its outer end. A bearing 96 disposed above the plate 87 serves to hold the shaft 88 stable and this bearing is supported by stay bars 97 secured thereto and to the frame A. Another bearing 98 is positioned beneath the plate 87 and serves to support the extreme lower end of the shaft 88, said bearing being held in place by means of stay rods 99 one end of which latter is secured to the bearing and the other end to the plate 87.

Mounted on the lower side of the plate 87 is a bracket 100 in which is journaled a shaft 101 extending transversely of the machine. This shaft has fixed on its inner end a beveled gear 102 which meshes with a beveled gear 103 fixed on the shaft 88 between the plate 87 and the bearing 98. Fixed on the outer end of the shaft 101 is a belt wheel 104 which is disposed in alinement with the belt wheel 82 and connected therewith by means of a belt 105. By this construction it will be apparent that upon the rotation of the shaft 80, the shaft 101 will in turn be rotated and that the rotation of the last named shaft will effect a rotation of the shaft 88 through the medium of the meshing gears 102 and 103. Upon the rotation of the shaft 88 the gear 93 which is fixed thereto will also be rotated and this rotation of the gear 93 will be transmitted to the shaft 95 by the gear 94. It will also be apparent that as the member 90 is free to rotate in the recess 89, the free end of the conveyer F may be moved laterally of the machine in either direction without in any manner interfering with the rotation of the shaft 95 owing to the arrangement of the gears 93 and 94.

The hopper 85 of the conveyer F is separate from the trough portion 84 and is pivotally connected to the outer end of the latter by means of ears or extensions 106 which embrace the trough section 84 and are pivotally connected thereto by pins 107. This pivotal connection will permit the hopper portion 85 to be disposed at an angle to the trough portion 84 during the operation of the machine.

Journaled between the sides of the hopper 85 is a shaft 108 upon which is fixed sprocket wheels 109 disposed in spaced relation to each other. Corresponding sprocket wheels are fixed on the shaft 95 and traveling on the sprocket wheels 109 and disposed in spaced relation to each other is a pair of sprocket chains 111. The links of these sprocket chains 111 are spaced at intervals by bars 112 and thus is formed an endless conveyer adapted to carry the grain from the hopper 85 to the hopper 83 as will be apparent, the operation of the endless conveyer being effected by the rotation of the shaft 95.

In order to hold the conveyer F in the position shown in dotted lines in Fig. 2 there is provided a pivoted frame G secured to the axle 21 and including side members 113 and 114 connected together at their free ends by a roller 115 which is rotatably mounted in bearings carried by said side members 113 and 114 respectively. The side members 113 and 114 have mounted thereon adjacent the roller 115 ears 116 in each of which is movably secured a hook member 118. These hook members are adapted to engage the trough portion of the conveyer as shown in dotted lines in Fig. 1. Also formed on the side members 113 and 114 adjacent the axle 21 are perforated ears 119 which are adapted to be engaged by respective hook members 120 carried by the arms 19 and 20 respectively to hold the frame G and the conveyer F in the position shown in dotted lines in Fig. 1.

Rising from the upper side members 10 and 11 between the shaft 80 and the hopper 83 are standards 121 which are connected together at their upper ends by a cross member 123. Secured to the uprights 121 and 122 near their upper ends is another cross member 124 to which is attached a double sheave 125, while another sheave 126 of the single type is suitably secured to the conveyer F adjacent the inner end of the hopper 85. A cable 127 has one end secured to the sheave 126 and is then passed over said sheave and also over the double sheave 125 and the other end of said cable is secured to a drum and ratchet mechanism 128 supported by the uprights 121 and 122. By the operation of this drum and ratchet mechanism 128 it will be apparent that the free end of the conveyer F may be raised and lowered as desired.

What is claimed is:

The combination with a main supporting frame; of a conveyer frame pivoted to said main frame and having a free end movable vertically to and from the main frame, a supporting frame pivoted on the main frame in spaced relation to the pivot of the conveyer frame and including side members having their free ends spaced to permit the conveyer frame to lie therebetween, and a releasable brace connecting said supporting frame and conveyer frame whereby the conveyer frame will be held against displacement from between the side members and supporting frame held from movement outward along the conveyer frame.

In testimony whereof, I affix my signature, in presence of two witnesses.

RILEY O. WELCH.

Witnesses:
W. S. BEAN,
JOHN HOLMES.

---

Copies of this patent may be obtained for five cents each, by addressing the "Commissioner of Patents, Washington, D. C."